United States Patent
Featonby et al.

(10) Patent No.: US 10,169,841 B1
(45) Date of Patent: Jan. 1, 2019

(54) DYNAMIC INTERFACE SYNCHRONIZATION FOR VIRTUALIZED GRAPHICS PROCESSING

(71) Applicant: Amazon Technologies, Inc., Seattle, WA (US)

(72) Inventors: Malcolm Featonby, Sammamish, WA (US); Douglas Cotton Kurtz, Sammamish, WA (US); Paolo Maggi, Alba (IT); Umesh Chandani, Seattle, WA (US); John Merrill Phillips, Jr., Seattle, WA (US); Yuxuan Liu, Seattle, WA (US); Adithya Bhat, Seattle, WA (US); Mihir Sadruddin Surani, Seattle, WA (US); Andrea Curtoni, Asti (IT); Nicholas Patrick Wilt, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/470,821

(22) Filed: Mar. 27, 2017

(51) Int. Cl.
*G06T 1/20* (2006.01)
*G06T 1/60* (2006.01)
*G06F 9/455* (2018.01)

(52) U.S. Cl.
CPC .............. *G06T 1/20* (2013.01); *G06F 9/455* (2013.01); *G06T 1/60* (2013.01)

(58) Field of Classification Search
CPC ........... G06T 1/20; G06T 15/005; G06T 1/60; G06T 15/04; G09G 5/363; G06F 3/14
See application file for complete search history.

(56) References Cited

U.S. PATENT DOCUMENTS

| 9,069,622 B2 | 6/2015 | Post et al. |
| 9,098,323 B2 | 8/2015 | Mitra et al. |

(Continued)

FOREIGN PATENT DOCUMENTS

WO 2014100558 6/2014

OTHER PUBLICATIONS

NICE, "DCV Administration Guide," NICE s.r.l, Asti, Italy, Jul. 2015, Source: https://www.nice-software.com/download/nice-dcv-2014#documentation, pp. 1-96.

(Continued)

*Primary Examiner* — Todd Buttram
(74) *Attorney, Agent, or Firm* — Robert C. Kowert; Meyertons, Hood, Kivlin, Kowert & Goetzel, P.C.

(57) ABSTRACT

Methods, systems, and computer-readable media for dynamic interface synchronization for virtualized graphics processing are disclosed. A GPU interface synchronization request is sent from a compute instance to a graphics processing unit (GPU) server via a network. The GPU server comprises a virtual GPU attached to the compute instance and implemented using at least one physical GPU. Based at least in part on the GPU interface synchronization request, a shared version of a GPU interface is determined for use with the compute instance and the GPU server. Program code of the shared version of the GPU interface is installed on the compute instance and on the GPU server. Using the shared version of the GPU interface, the compute instance sends instructions to the virtual GPU over the network, and the virtual GPU generates GPU output associated with the instructions.

20 Claims, 14 Drawing Sheets

(56) References Cited

U.S. PATENT DOCUMENTS

| | | | |
|---|---|---|---|
| 2007/0033156 A1* | 2/2007 | Limpert | G06F 17/30011 |
| 2011/0083131 A1 | 4/2011 | Pirzada et al. | |
| 2011/0134111 A1* | 6/2011 | Stone | G06F 9/45541 |
| | | | 345/419 |
| 2011/0182422 A1* | 7/2011 | Anderson | G06F 21/64 |
| | | | 380/30 |
| 2012/0069032 A1 | 3/2012 | Hansson et al. | |
| 2012/0154389 A1 | 6/2012 | Bohan et al. | |
| 2014/0055466 A1 | 2/2014 | Petrov et al. | |
| 2014/0169471 A1 | 6/2014 | He | |
| 2014/0176583 A1 | 6/2014 | Abiezzi et al. | |
| 2014/0181806 A1 | 6/2014 | Abiezzi et al. | |
| 2014/0215462 A1 | 7/2014 | Kuo et al. | |
| 2014/0286390 A1 | 9/2014 | Fear | |
| 2015/0067672 A1 | 3/2015 | Mitra et al. | |
| 2015/0097844 A1 | 4/2015 | Wankhede et al. | |
| 2015/0116335 A1 | 4/2015 | Chen et al. | |
| 2015/0220354 A1 | 8/2015 | Nair | |
| 2015/0221063 A1* | 8/2015 | Kim | G06T 1/60 |
| | | | 345/557 |
| 2015/0370589 A1 | 12/2015 | Bidarkar et al. | |
| 2015/0370620 A1* | 12/2015 | Lai | G06F 9/445 |
| | | | 715/765 |
| 2016/0239333 A1 | 8/2016 | Cowperthwaite et al. | |
| 2016/0247248 A1 | 8/2016 | Ha et al. | |
| 2017/0300945 A1* | 10/2017 | Nigul | G06Q 30/0204 |
| 2018/0025173 A1* | 1/2018 | Keyes | G06F 21/6218 |

OTHER PUBLICATIONS

Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.

U.S. Appl. No. 14/938,457, filed Nov. 11, 2015, Nicholas Patrick Wilt et al.

U.S. Appl. No. 14/938,461, filed Nov. 11, 2015, Nicholas Patrick Wilt et al.

U.S. Appl. No. 14/938,656, filed Nov. 11, 2015, Nicholas Patrick Wilt et al.

U.S. Appl. No. 14/938,654, filed Nov. 11, 2015, Nicholas Patrick Wilt et al.

U.S. Appl. No. 15/177,225, filed Jun. 8, 2016, Nicholas Patrick Wilt.

U.S. Appl. No. 15/177,262, filed Jun. 8, 2016, Nicholas Patrick Wilt.

Jeff Weiss, et al., "NVIDIA Grid VCPU Deployment Guide for Vmware Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.

U.S. Appl. No. 14/822,511, filed Aug. 10, 2015, Nicholas Patrick Wilt, et al.

Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.

Lin Shi, et al., "vCUDA: GPU-Accelerated High-Performance Computing in Virtual Machines", IEEE Transaction on Computers, vol. 61, No. 6, Jun. 2012, pp. 804-816.

Matthew Danish, et al., "Virtual-CPU Scheduling in the Quest Operating System", 2011 17th IEEE Real-Time and Embedded Technology and Application Symposium, Apr. 11, 2011, pp. 169-179.

Mark Panahi, et al., "A Framework for Real-Time Service-Oriented Architecture", 2009 IEEE Conference on Commerce and Enterprise Computing (CED '09), Jul. 20, 2009, pp. 460-467.

Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.

Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.

U.S. Appl. No. 15/178,292, filed Jun. 9, 2016, Nicholas Patrick Wilt.

U.S. Appl. No. 15/409,482, filed Jan. 18, 2017, Malcolm Featonby, et al.

U.S. Appl. No. 15/404,131, filed Jan. 11, 2017, Malcolm Featonby, et al.

Installing VMware GPU on vSphere 6.0, Martijin Smit, Mar. 7, 2015, pp. 1-10.

* cited by examiner

DYNAMIC INTERFACE SYNCHRONIZATION FOR VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
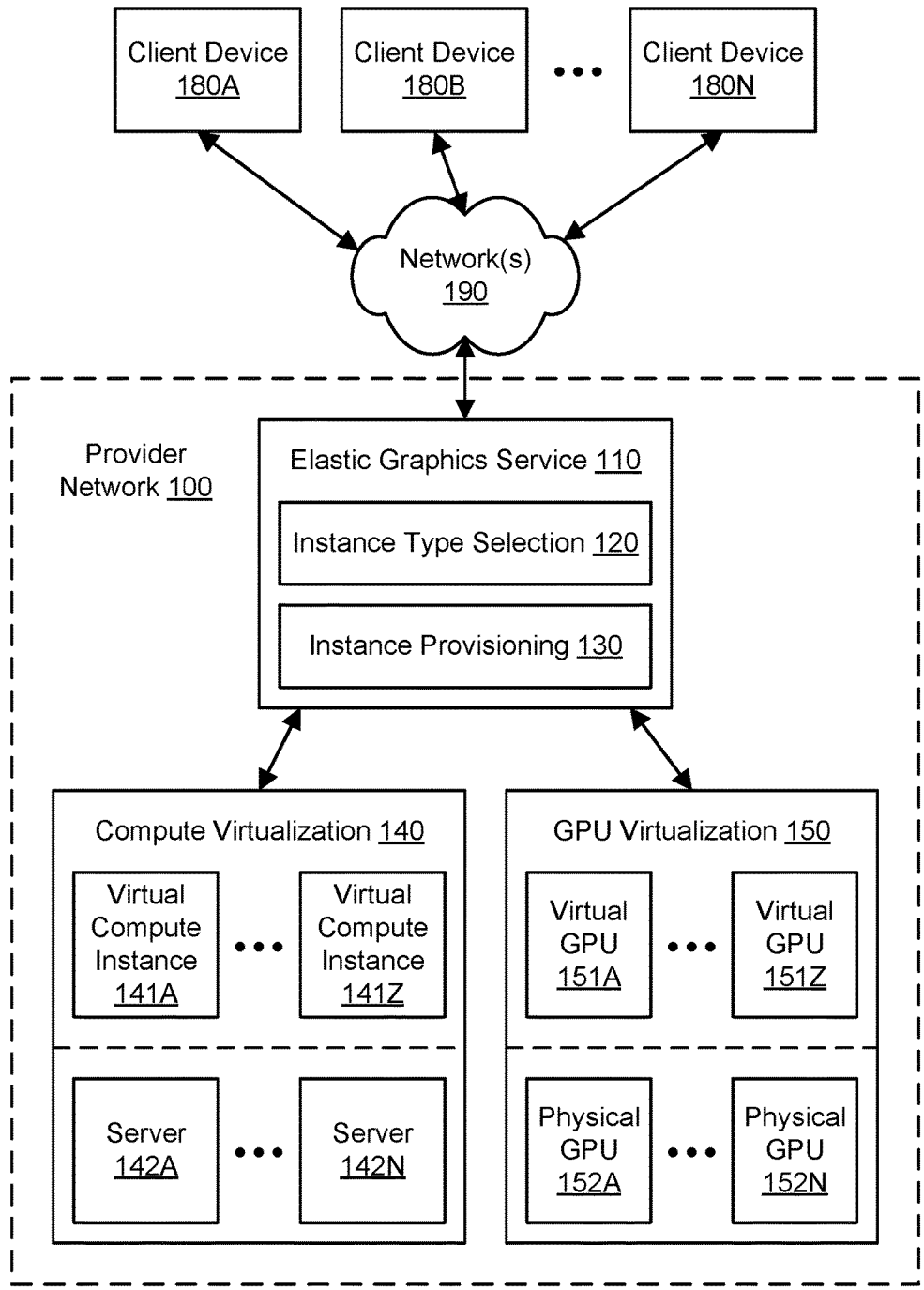
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for dynamic interface synchronization for virtualized graphics processing are described. Using resources of a provider network, a virtual graphics processing unit (GPU) may be provisioned for attachment to a virtual compute instance. The virtual GPU may be hosted in a GPU server that communicates with the virtual compute instance via a network. A GPU interface may be installed on the GPU server for utilizing the virtual GPU to assist the virtual compute instance in graphics processing or general-purpose GPU (GPGPU) computing. A GPU interface may also be installed on the instance, and that interface may differ initially from the interface installed on the GPU server. The GPU interfaces (or drivers) on the two components may represent different interface families (e.g., OpenGL, DirectX, Vulkan, OpenCL, CUDA) or different versions within the same interface family (e.g., various numbered versions of OpenGL). To permit the virtual GPU to be used by an application on the instance, the versions of the GPU interface may be synchronized between the GPU server and the instance. To initiate the synchronization and determine a shared version of a GPU interface, the instance may send a synchronization request to the GPU server. The request may indicate values for one or more parameters, e.g., values indicating the current interface version on the instance, whether the instance has another virtual GPU attachment, whether the interface version already on the instance should be used as the shared version, and/or other suitable metadata. Based (at least in part) on the synchronization request, the GPU server may either cause installation of the GPU server's particular GPU interface version on the instance or install on itself the instance's particular GPU interface version. Once the versions of the GPU interface are synchronized, the instance may execute an application and use the shared version of the GPU interface to send instructions to the GPU server, where the virtual GPU may generate output associated with those instructions. Using the techniques described herein for dynamic GPU interface synchronization, a particular GPU interface contractually required by an application may be used with a virtual GPU, interface updates may be rolled out to both instances and GPU servers, and/or interface updates may be rolled back on both instances and GPU servers.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of servers 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying servers 142A-142N may be heterogeneous, and the underlying physical GPUs 152A-152N may be heterogeneous as well. The servers may also be referred to as physical compute instances. In one embodiment, the compute virtualization 140 may use techniques for multi-tenancy to provision virtual compute instances 141A-141Z that exceed the servers 142A-142N in number. In one embodiment, the GPU virtualization 150 may use techniques for multi-tenancy to provision virtual GPUs 151A-151Z that exceed the physical GPUs 152A-152N in number.

The elastic graphics service 110, also referred to herein as a graphics service, may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying server for the client (e.g., from a pool of available servers and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 12), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or servers or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 12.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 12:
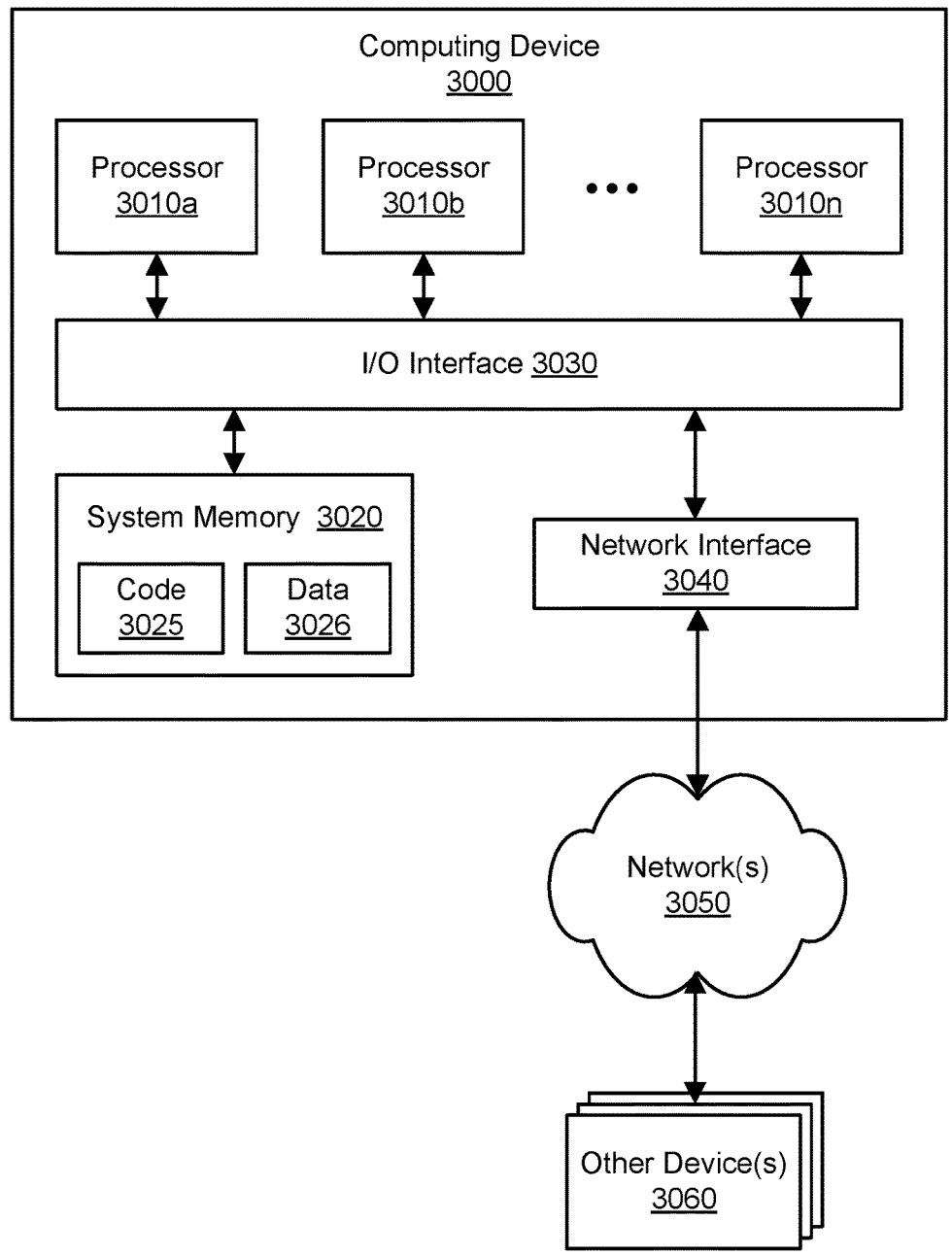
FIG. 12 illustrates an example computing device that may be used in some embodiments.

The provider network 100 may include a plurality of computing devices, any of which may be implemented by the example computing device 3000 illustrated in FIG. 12. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although servers 142A through 142N are shown for purposes of example and illustration, it is contemplated that different quantities and configurations of servers may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
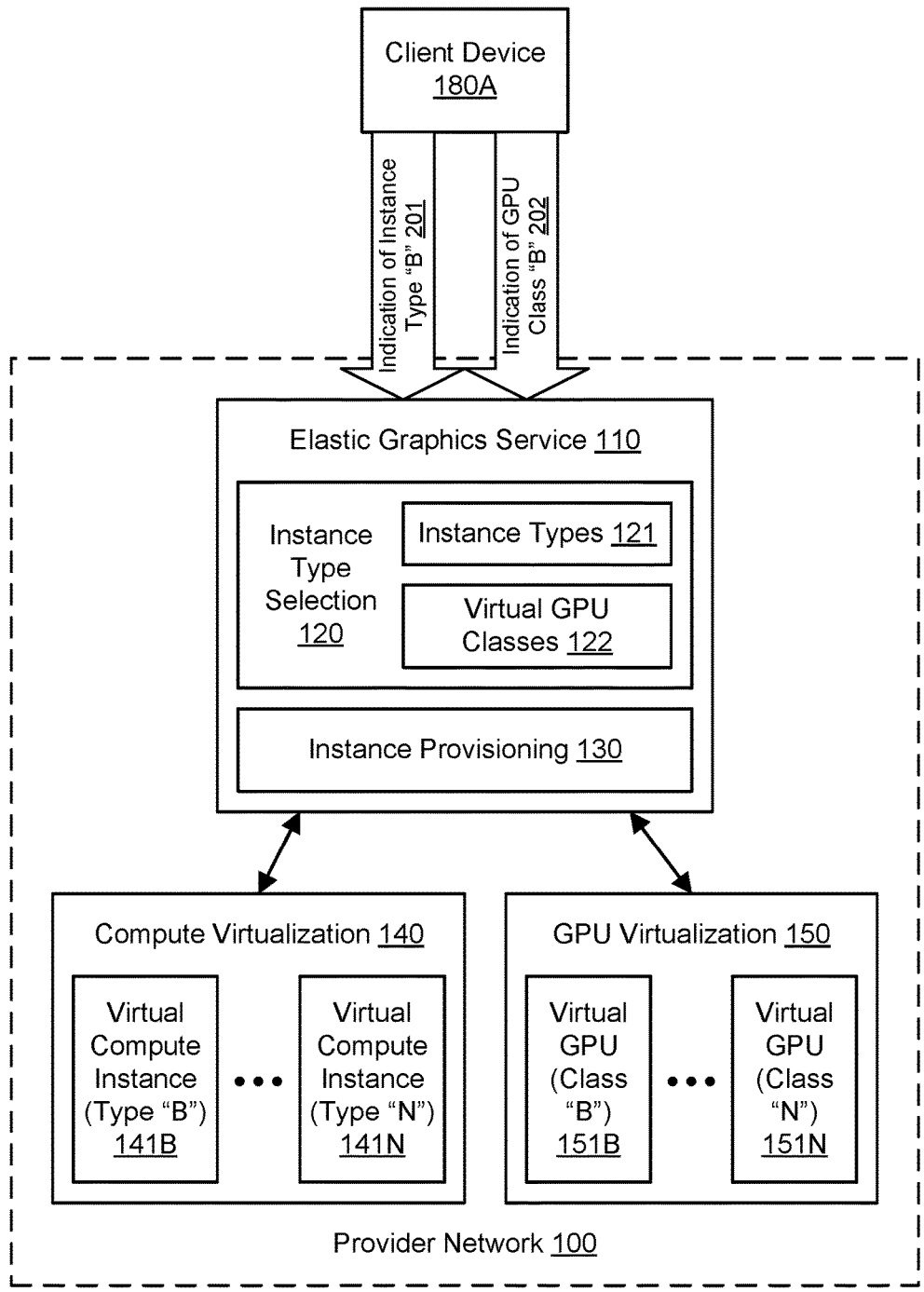
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
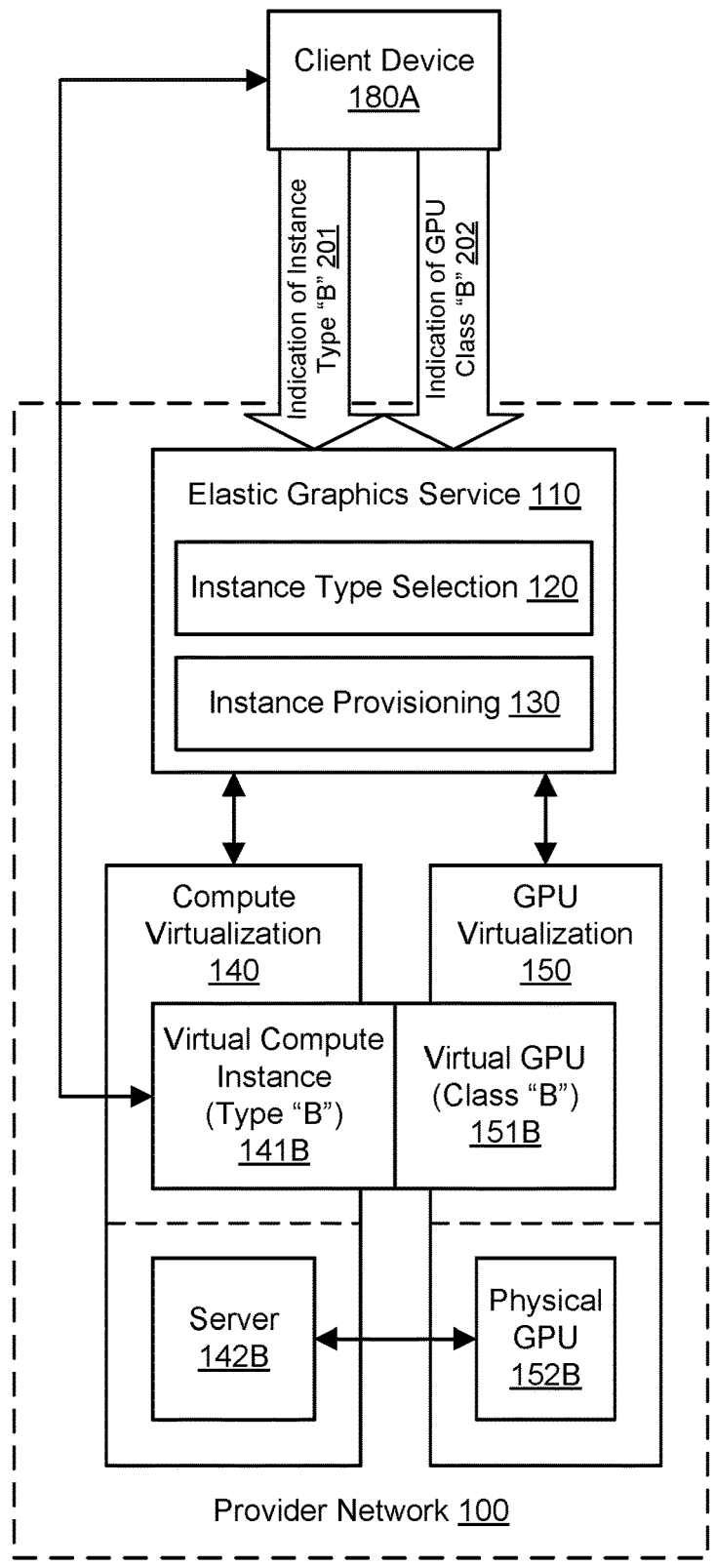
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a server 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying server for the client (e.g., from a pool of available servers and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a server 142B may communicate with a physical GPU 152B, e.g., over a network. The physical GPU 152B may be located in a different computing device than the server 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
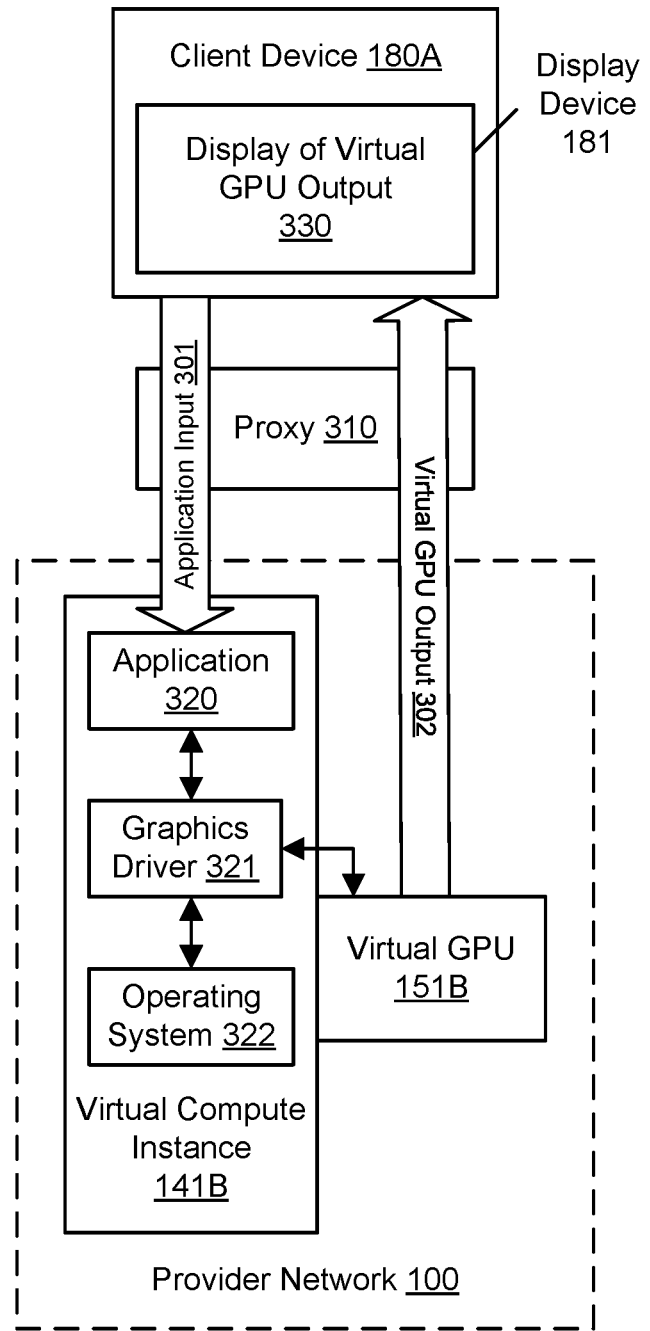
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying server 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or coprocessor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
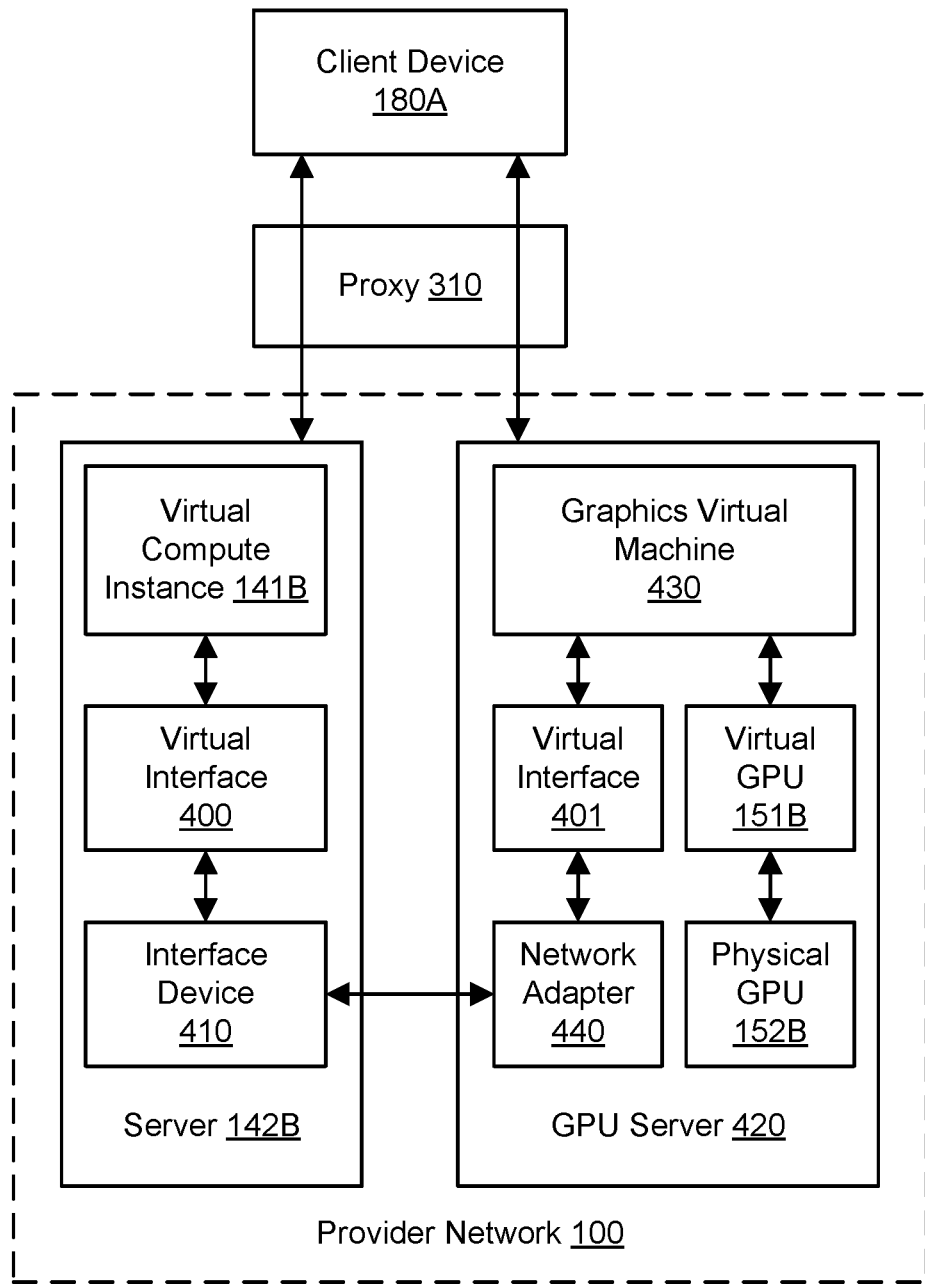
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a server 142B, and the virtual GPU 151B attached to that instance 141B may be implemented using a separate and distinct computing device termed a GPU server or graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the GPU server 420 (and thus with the physical GPU 152B) over a network. The interface device 410 may be implemented in any suitable manner, e.g., as an expansion card (such as a PCI Express card) or attached peripheral device for the server 142B. The interface device 410 may use single root I/O virtualization to expose hardware virtual functions to the virtual compute instance 141B. In one embodiment, the server 142B may implement a plurality of virtual compute instances, each with its own virtual interface, and the virtual compute instances may use the interface device 410 to interact with the corresponding virtual GPUs on one or more GPU servers. The server 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the GPU server 420, and the GPU server 420 may execute the commands on behalf of the interface device. The GPU server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The GPU server 420 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the GPU server 420 may implement a plurality of virtual GPUs (such as virtual GPU 151B) using one or more physical GPUs (such as physical GPU 152B), and the virtual GPUs may interact with the corresponding virtual compute instances on one or more servers over a network. The GPU server 420 may communicate with the proxy 310 using a suitable remoting protocol, e.g., to send data to and receive data from the client device 180A. For example, the GPU server 420 may generate virtual GPU output based on the commands sent from the interface device 410. The virtual GPU output may be provided to the client device 180A through the proxy 310, e.g., from the server 142B or GPU server 420.

Figure 5:
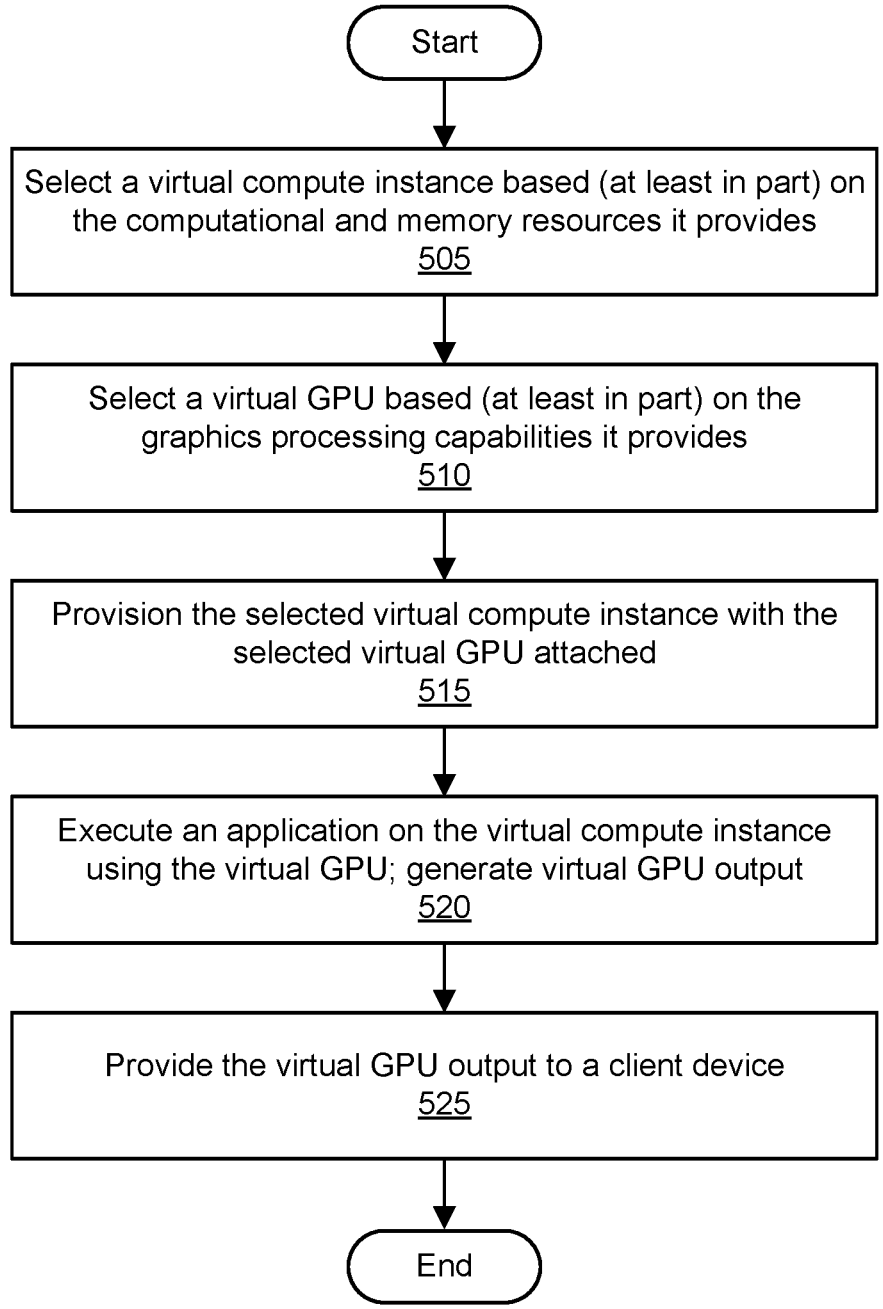
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a server. The virtual GPU may be implemented using a physical GPU. The physical GPU may be attached to a different computing device than the computing device that provides the CPU resources for the virtual compute instance. The physical GPU may be accessible to the server over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying server) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different server may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Server(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available server(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying server and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

In some embodiments, graphics overlays may be implemented with the techniques for virtualized graphics processing described herein. A virtual compute instance may be provisioned with an attached virtual GPU. In executing a particular application, the virtual compute instance may send graphics instructions to the graphics server for generating graphical output associated with the application. The graphical output may include graphical elements, including objects, pixels, and so on, as determined by execution of the graphics instructions sent from the virtual compute instance. A graphics overlay may be added to the graphical output after the graphics instructions from the virtual compute instance are received by the graphics server. The graphics overlay may include one or more additional graphical elements, and the additional graphical elements may be placed on top of (and may therefore obscure, at least partially) any of the graphical elements generated by execution of the "original" graphics instructions sent from the virtual compute instance. For example, the graphics overlay may include a display of metadata such as a current frame rate, an in-application chat window, and so on. Instead of using code injection in an application to modify or append graphics instructions to generate an overlay, the graphics overlay may be generated at the graphics server using additional graphics instructions determined at that server, at a dedicated graphics overlay server using graphical output received from the graphics server, or at the server using graphical output received from the graphics server. Using these techniques, graphical output of a virtual GPU may be modified with overlays in a trustworthy manner, e.g., without necessarily modifying an application on whose behalf the graphical output is generated.

Dynamic Interface Synchronization for Virtualized Graphics Processing

Figure 6:
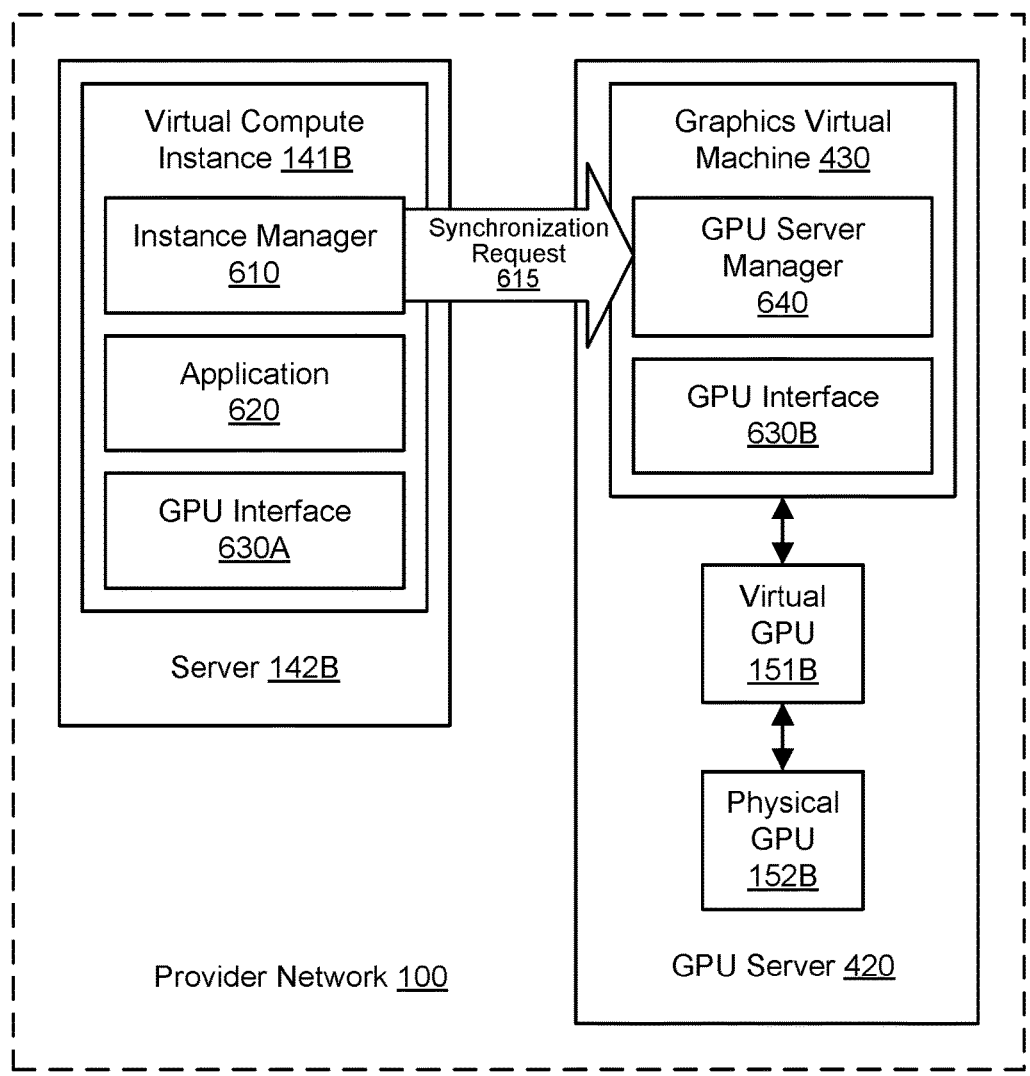
FIG. 6 illustrates an example system environment for dynamic interface synchronization for virtualized graphics processing, including a virtual compute instance sending a GPU interface synchronization request to a GPU server that hosts a virtual GPU to be attached to the instance, according to one embodiment.

FIG. 6 illustrates an example system environment for dynamic interface synchronization for virtualized graphics processing, including a virtual compute instance sending a GPU interface synchronization request to a GPU server that hosts a virtual GPU to be attached to the instance, according to one embodiment. As discussed above, a virtual GPU 151B may be attached to a virtual compute instance 141B in order to assist the instance in graphics processing or general-purpose GPU (GPGPU) computing. The virtual compute instance 141B may be implemented using a server (also referred to as a physical compute instance) 142B, and the virtual GPU 151B may be implemented using a physical GPU 152B hosted in a GPU server (also referred to as a graphics appliance) 420. The server 142B and GPU server 420 may be implemented using resources of a provider network (potentially a multi-tenant provider network) and may communicate via one or more networks. In one embodiment, the virtual GPU 151B may be requested for attachment to the instance 141B as part of a request to an elastic graphics service 110, either on provisioning and launch of the instance or after the instance is already running. As part of the process of attaching the virtual GPU 151B to the instance 141B, a dynamic GPU interface synchronization process may be performed to reconcile versioning differences between GPU interfaces on the virtual compute instance and the GPU server that hosts the virtual GPU.

In one embodiment, the virtual compute instance 141B may initially be configured with an instance manager (also referred to as an application instance manager) 610. In one embodiment, the instance manager software 610 may be initially installed in memory or storage of the virtual compute instance 141B upon launch of the instance based (at least in part) on its inclusion in a machine image containing essential software for the instance. The instance manager 610 may be executable to perform tasks related to management of the instance 141B, such as managing interactions with a corresponding GPU server manager 640 on the GPU server 420, reporting health status to the GPU server manager, periodically reporting heartbeat messages to the GPU server manager, and so on. In one embodiment, the virtual compute instance 141B may initially be configured with a particular GPU interface 630A. The GPU interface 630A may represent a particular version (e.g., as indicated by a version number) of a particular GPU interface or driver family (e.g., OpenGL, DirectX, Vulkan, OpenCL, CUDA, and so on). The GPU interface 630A may also be referred to as a driver. In various embodiments, the GPU interface 630A may be implemented within the application layer or in another layer on the instance 141B. In one embodiment, the GPU interface 630A may be initially installed in memory or storage of the virtual compute instance 141B upon launch of the instance based (at least in part) on its inclusion in a machine image containing essential software for the instance. The virtual compute instance 141B may also be configured to store and run one or more applications, such as application 620, that may seek to use the functionality of the virtual GPU 151B. In one embodiment, the particular version of the GPU interface 630A may be installed on the instance 141B based (at least in part) on a requirement associated with the application, e.g., if the application is contractually obligated to use the particular version. The virtual compute instance 141B and application 620 may be under the control of a client of the provider network 100, e.g., using a client computing device external to the provider network.

A graphics virtual machine 430 may be associated with the virtual GPU 151B on the GPU server 420, e.g., to mediate access to the functionality of the virtual GPU 151B. In one embodiment, the graphics virtual machine 430 may initially be configured with a GPU server manager (also referred to as a graphics appliance manager) 640. In one embodiment, the GPU server manager software 640 may be initially installed in memory or storage of the GPU server 420 upon launch based (at least in part) on its inclusion in a machine image containing essential software. The GPU server manager 640 may be executable to perform tasks related to management of the GPU server 420 and/or graphics virtual machine 430, such as managing interactions with a corresponding instance manager 610 on the virtual compute instance 141B. In one embodiment, the graphics virtual machine 430 may initially be configured with one or more GPU interfaces such as a particular GPU interface 630B. The GPU interface 630B may represent a particular version (e.g., as indicated by a version number) of a particular GPU interface or driver family (e.g., OpenGL, DirectX, Vulkan, OpenCL, CUDA, and so on). The GPU interface 630B may also be referred to as a driver. In one embodiment, the GPU interface 630B may be initially installed in memory or storage of GPU server 420 upon launch based (at least in part) on its inclusion in a machine image containing essential software. In one embodiment, upon provisioning and launch of the GPU server 420, the GPU server manager 640 may perform a bootstrapping procedure to check the currently installed version of the GPU interface, download and replace it with a later version if it is not up-to-date, and verify the installation.

In some circumstances, the interface 630A currently installed or otherwise in use on the instance 141B may differ from the interface 630B currently installed or otherwise in use on the GPU server 420. The GPU interfaces 630A and 630B may represent different interface families (e.g., OpenGL, DirectX, Vulkan, OpenCL, CUDA) or different versions within the same interface family (e.g., various numbered versions of OpenGL). In one embodiment, the latest stable version of a particular GPU interface family may initially be in use on the GPU server. However, the version initially in use at the instance may be a different version of the same GPU interface family or a version of an entirely different GPU interface family. In order to reconcile the two versions, or otherwise verify that the versions are compatible, a GPU interface synchronization request 615 may be sent from the virtual compute instance 141B to the GPU server 420 hosting the virtual GPU 151B.

The synchronization request 615 may represent a request for synchronization of the version and family of the GPU interface for common use on both the instance and the GPU server. In one embodiment, the synchronization request 615 may be sent by the instance manager 610 to the GPU server manager 640. To send the synchronization request 615, the instance manager 610 may perform a lookup of connection information for the GPU server manager 640 using an instance metadata service or other suitable component. In one embodiment, the virtual GPU 151B may be provisioned, e.g., from a pool of virtual GPU resources of the provider network 100, after a request for attachment of a virtual GPU is received by the elastic graphics service 110. In one embodiment, the instance manager 610 may wait for the GPU server manager 640 associated with that virtual GPU 151B to be reachable prior to sending the synchronization request 615. The synchronization request 615 may indicate values for one or more parameters that may affect the selection of a version of a GPU interface to be shared by both the instance 141B and the GPU server 420 (including the graphics virtual machine 430). In one embodiment, the synchronization request 615 may indicate the current interface version on the instance 141B. In one embodiment, the synchronization request may indicate whether the instance 141B already has at least one other virtual GPU attachment. In one embodiment, the synchronization request may indicate whether the interface version already on the instance 141B should be used as the shared version.

To permit the virtual GPU 151B to be used by an application 620 on the instance 141B, the versions of the GPU interface may be synchronized between the GPU server 429 and the instance 141B. A shared version of a GPU interface may be determined for use on both the instance 141B and the GPU server 420. The shared version may represent a particular version (e.g., as indicated by a version number) of a particular GPU interface or interface family (e.g., OpenGL, DirectX, Vulkan, OpenCL, CUDA, and so on). In one embodiment, the shared version may be chosen between the interface 630A initially installed on the instance and the interface 630B initially installed on the GPU server. The shared version may be determined based (at least in part) on the parameter values associated with the synchronization request 615.

Figure 7A:
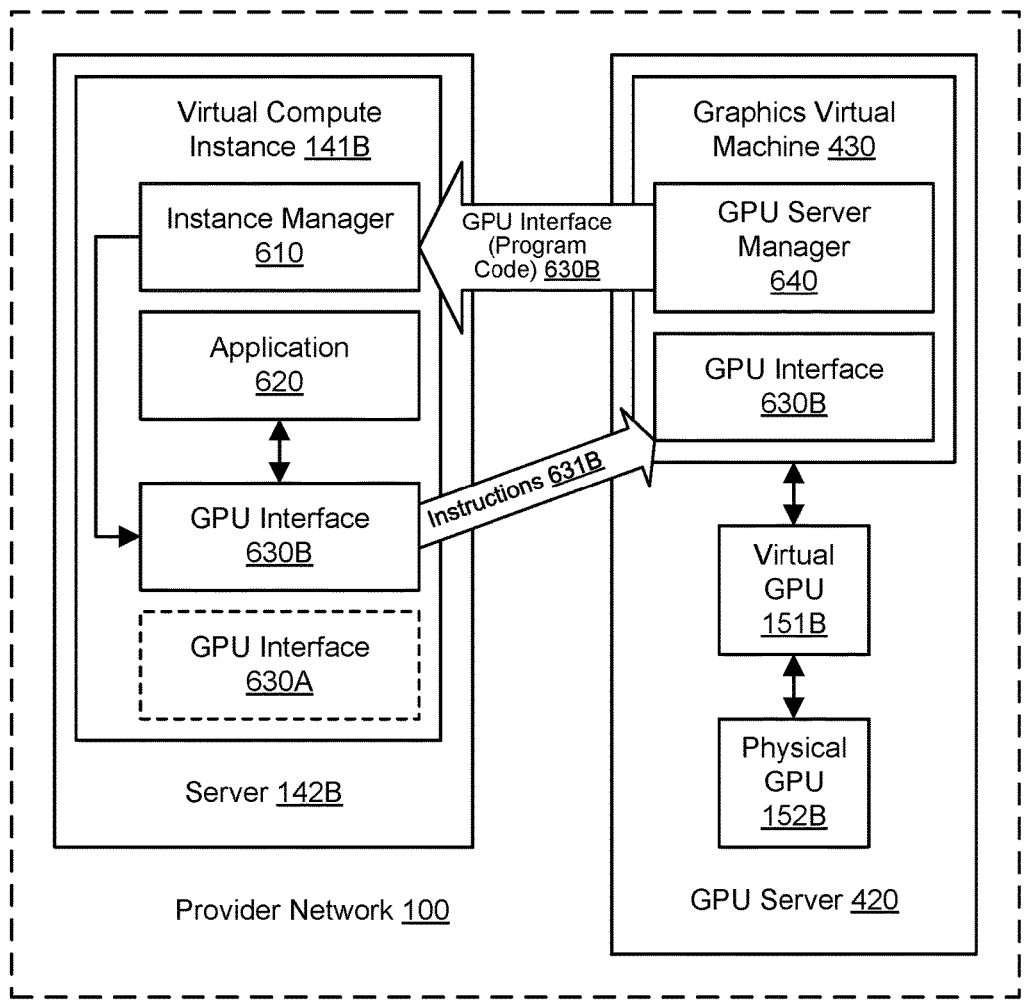
FIG. 7A illustrates further aspects of the example system environment for dynamic interface synchronization for virtualized graphics processing, including installing a shared version of a GPU interface on the virtual compute instance as provided by the GPU server and based (at least in part) on the GPU interface synchronization request, according to one embodiment.
Figure 7B:
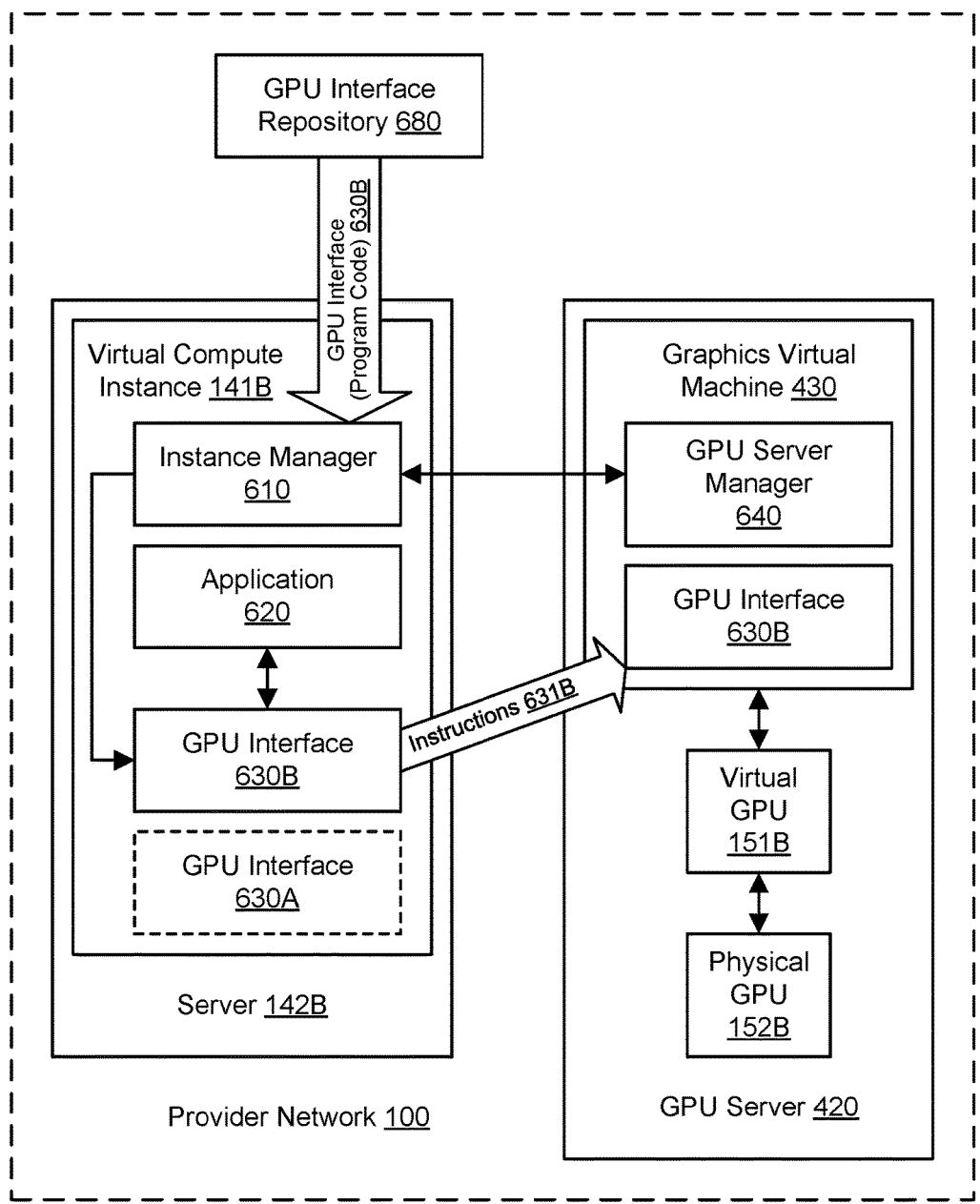
FIG. 7B illustrates further aspects of the example system environment for dynamic interface synchronization for virtualized graphics processing, including installing a shared version of a GPU interface on the virtual compute instance as provided by a GPU interface repository and based (at least in part) on the GPU interface synchronization request, according to one embodiment.

FIG. 7A illustrates further aspects of the example system environment for dynamic interface synchronization for virtualized graphics processing, including installing a shared version of a GPU interface on the virtual compute instance as provided by the GPU server and based (at least in part) on the GPU interface synchronization request, according to one embodiment. FIG. 7B illustrates further aspects of the example system environment for dynamic interface synchronization for virtualized graphics processing, including installing a shared version of a GPU interface on the virtual compute instance as provided by a GPU interface repository and based (at least in part) on the GPU interface synchronization request, according to one embodiment. In the example of FIG. 7A, the GPU interface 630B associated with the GPU server 420 has been selected as the shared GPU interface, e.g., based on the parameter values of the synchronization request 615. For example, if the request 615 indicates that the instance does not have any other virtual GPU attachments, and the request does not indicate that the interface currently in use on the instance should be selected as the shared interface, then the GPU interface 630B currently in use at the GPU server may be selected as the shared version.

To enable use of the virtual GPU 151B by the application, the shared version of the GPU interface may be installed on both the instance and the GPU server. In one embodiment, if the version 630B already in use on the GPU server is selected as shown in the example of FIG. 7A, then program code for that version may be provided to the instance 141B for installation and use. Installation of the program code may include storing it in persistent storage associated with the instance 141B and loading at least a portion of it into memory associated with the instance for use during runtime. In one embodiment, as shown in FIG. 7A, the program code 630B for the shared version of the GPU interface may be provided to the instance 141B from the GPU server 430, e.g., by sending the code from the GPU server manager 640 to the instance manager 610. In one embodiment, as shown in FIG. 7B, the program code 630B for the shared version of the GPU interface may be provided to the instance 141B from a GPU interface repository 680, potentially as directed or mediated by the GPU server manager 640. For example, the GPU server manager 640 may send a token to the instance manager 610 in response to the synchronization request 615, and the instance manager may use that token to obtain the program code 630B from the repository 680. In various embodiments, the instance manager 610 may select, obtain, and/or install the program code 630B from the repository 680 manually (e.g., as directed by user input) or automatically. The repository 680 may store a set of GPU interfaces for installation on virtual compute instances and/or graphics virtual machines in the provider network 100. In various embodiments, the repository 680 may represent a component within the provider network 100 or a component outside the provider network, e.g., a system or service maintained by a vendor or publisher of GPU interfaces. The instance manager 610 may install the shared version of the GPU interface 630B. The instance manager 610 may also remove or disable the initially installed version of the GPU interface 630A, e.g., by removing it from memory. In one embodiment, both interfaces 630A and 630B may be maintained on the instance 141B, but only the one that is shared with the GPU server 420 may be used for the particular application 620. In one embodiment, both interfaces 630A and 630B may be installed on the instance 141B initially (e.g., before sending the synchronization request 615), but only the one that is shared with the GPU server 420 may be selected and used for the particular application 620. In one embodiment, a security check on the program code 630B may be performed by the instance 141B, e.g., to ensure that the interface is properly signed or otherwise verified as legitimate.

Once the GPU interfaces are synchronized using the shared version 630B, then the instance manager 610 and GPU server manager 640 may communicate that the virtual GPU 151B is ready for use by the instance 141B. Execution of the application 620 may then be initiated on the instance. Execution of the application 620 may include generating requests for GPU functionality. The shared version of the GPU interface 630B may be used to send instructions 631B associated with execution of the application 620 from the instance 141B to the GPU server 420 via one or more networks. The instructions 631B may be expressed according to the particular version of the particular GPU interface that constitutes the shared version 630B. For example, if the shared version 630B represents a particular numbered version of OpenGL, then the instructions 631B may be expressed as one or more function calls that are formatted in accordance with that particular numbered version. On the GPU server 420, output associated with those instructions 631B may be generated using the virtual GPU 151B attached to the instance 141B. The output may also be generated according to the shared version of the GPU interface 630B as installed on the GPU server 420. As discussed with reference to FIG. 1 through FIG. 5, the GPU output may be sent to the instance 141B, to a client computing device, or to any other suitable recipient.

Figure 8:
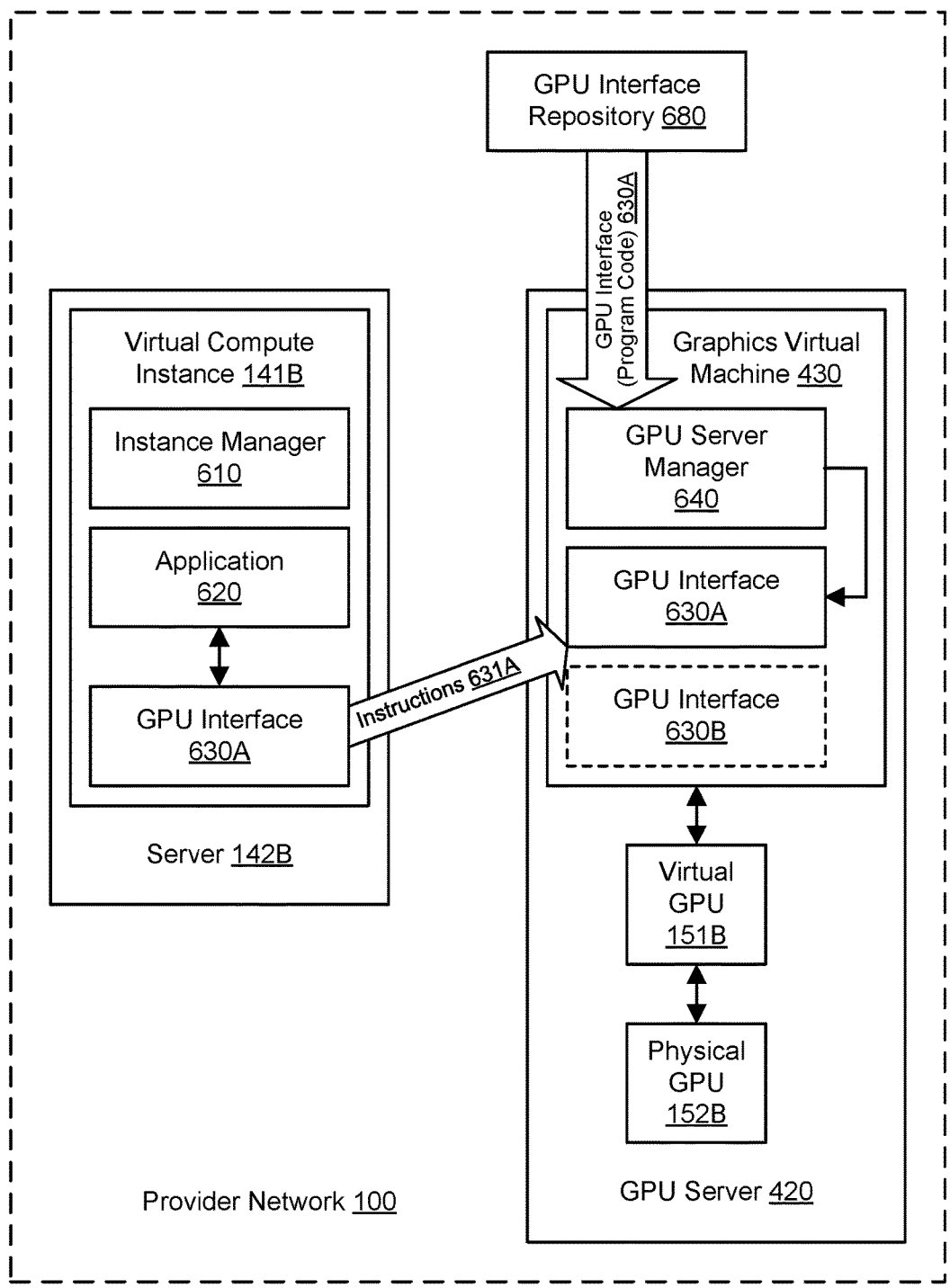
FIG. 8 illustrates further aspects of the example system environment for dynamic interface synchronization for virtualized graphics processing, including installing a shared version of a GPU interface on the GPU server based (at least in part) on the GPU interface synchronization request, according to one embodiment.

FIG. 8 illustrates further aspects of the example system environment for dynamic interface synchronization for virtualized graphics processing, including installing a shared version of a GPU interface on the GPU server based (at least in part) on the GPU interface synchronization request, according to one embodiment. In the example of FIG. 8, the GPU interface 630A associated with the instance 141B has been selected as the shared GPU interface, e.g., based on the parameter values of the synchronization request 615. For example, if the request 615 indicates that the instance already has at least one other virtual GPU attachment, then the shared version may be selected as the version 630A currently in use on the instance 141B in order to ensure compatibility with the other virtual GPU(s). As another example, the request 615 may indicate that the interface 630A currently in use on the instance 141B should be selected as the shared interface. In this manner, the application or its user may choose to "drive" the selection of the GPU interface, e.g., when the application is contractually obligated to use a particular version of a GPU interface.

To enable use of the virtual GPU 151B by the application, the shared version of the GPU interface may be installed on both the instance and the GPU server. In one embodiment, if the version 630A already in use on the instance is selected as shown in the example of FIG. 8, then program code for that version may be installed on the graphics virtual machine 430 on the GPU server 420. Installation of the program code may include storing it in persistent storage associated with the graphics virtual machine 430 and loading at least a portion of it into memory associated with the graphics virtual machine for use during runtime. In one embodiment, the program code 630A for the shared version of the GPU interface may be provided to the GPU server 420 from a GPU interface repository 680. The repository 680 may store a set of GPU interfaces for installation on virtual compute instances and/or graphics virtual machines in the provider network 100. In various embodiments, the repository 680 may represent a component within the provider network 100 or a component outside the provider network, e.g., a system or service maintained by a vendor or publisher of GPU interfaces. The GPU server manager 640 may install the shared version of the GPU interface 630A. The GPU server manager 640 may also remove or disable the initially installed version of the GPU interface 630B, e.g., by removing it from memory. In one embodiment, both interfaces 630A and 630B may be maintained in the GPU server 420 and/or graphics virtual machine 430, but only the one that is shared with the instance 141B may be used. In one embodiment, both interfaces 630A and 630B may be installed on the GPU server 420 initially (e.g., before receiving the synchronization request 615), but only the one that is shared with the instance 141B may be selected and used for the particular application 620. In one embodiment, a security check on the program code 630A may be performed by the GPU server manager 640, e.g., to ensure that the interface is properly signed or otherwise verified as legitimate. In one embodiment, the GPU server manager 640 may perform a bootstrapping procedure to check the currently installed version of the GPU interface, download and replace it with a different version if needed (e.g., as dictated by the interface synchronization process), and verify the installation.

Once the GPU interfaces are synchronized using the shared version 630A, then the instance manager 610 and GPU server manager 640 may communicate that the virtual GPU 151B is ready for use by the instance 141B. Execution of the application 620 may be initiated on the instance. Execution of the application 620 may include generating requests for GPU functionality. The shared version of the GPU interface 630A may be used to send instructions 631A associated with execution of the application 620 from the instance 141B to the GPU server 420 via one or more networks. The instructions 631A may be expressed according to the particular version of the particular GPU interface that constitutes the shared version 630A. For example, if the shared version 630A represents a particular numbered version of OpenGL, then the instructions 631A may be expressed as one or more function calls that are formatted in accordance with that particular numbered version. On the GPU server 420, output associated with those instructions 631A may be generated using the virtual GPU 151B attached to the instance 141B. The output may also be generated according to the shared version of the GPU interface 630A as installed on the GPU server 420. As discussed with reference to FIG. 1 through FIG. 5, the GPU output may be sent to the instance 141B, to a client computing device, or to any other suitable recipient.

Figure 9:
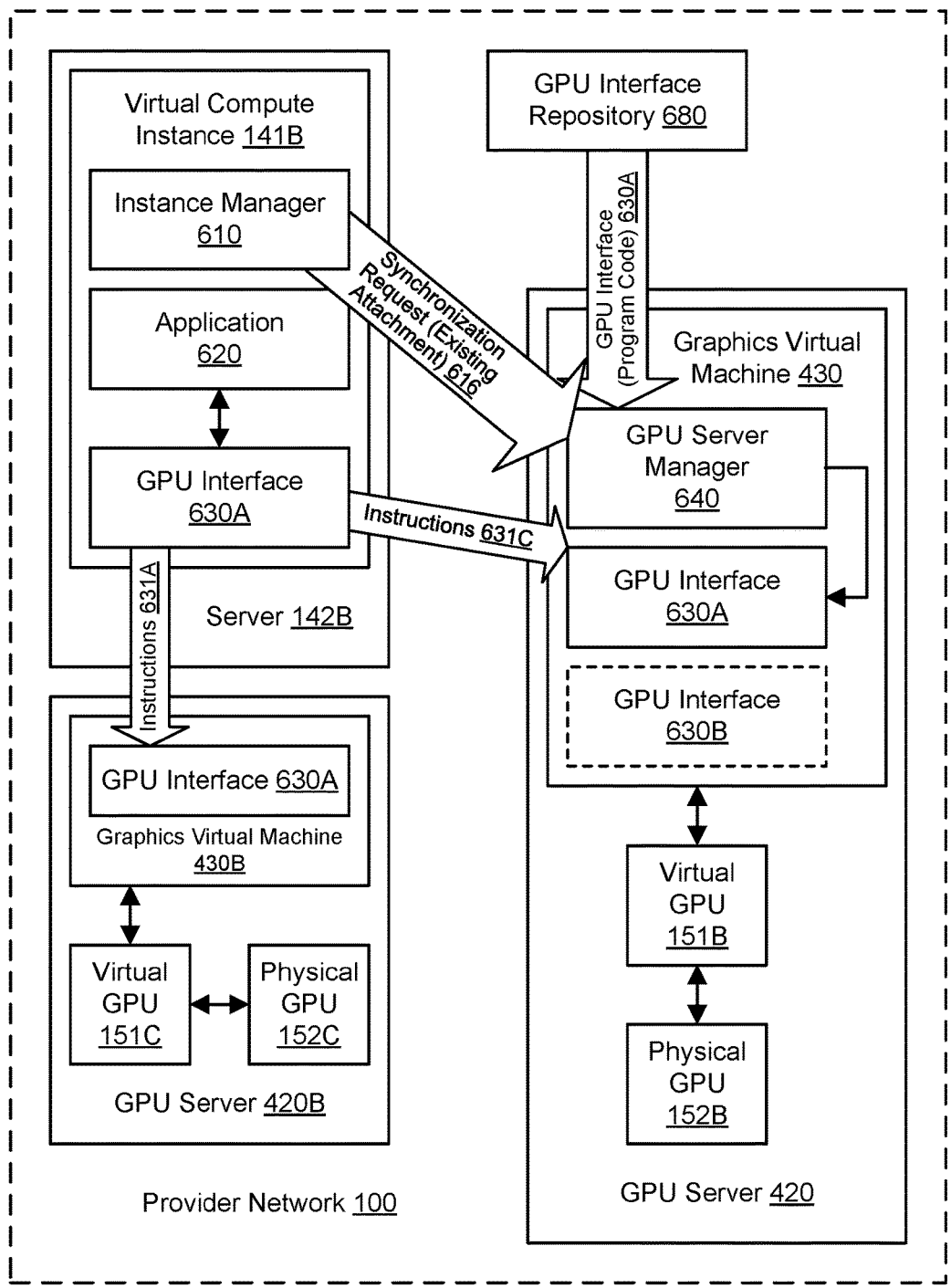
FIG. 9 illustrates further aspects of the example system environment for dynamic interface synchronization for virtualized graphics processing, including installing a shared version of a GPU interface on the GPU server based (at least in part) on the GPU interface synchronization request indicating an existing attachment of another virtual GPU to the virtual compute instance, according to one embodiment.

FIG. 9 illustrates further aspects of the example system environment for dynamic interface synchronization for virtualized graphics processing, including installing a shared version of a GPU interface on the GPU server based (at least in part) on the GPU interface synchronization request indicating an existing attachment of another virtual GPU to the virtual compute instance, according to one embodiment. In one embodiment, prior to attaching the virtual GPU 151B, a different virtual GPU 151C may be attached to the virtual compute instance 141B. The different virtual GPU 151C may be hosted in the same GPU server 420 or, as shown in the example of FIG. 9, a different GPU server 420B. The different virtual GPU 151C may be implemented using a physical GPU 152C, and access to the virtual GPU 151C may be mediated by a graphics virtual machine 430B. The virtual compute instance 141B may use a particular version of a GPU interface 630A to access the functionality of the attached virtual GPU 151C. The existing version of the GPU interface 630A may be used to send instructions 631A associated with execution of the application 620 from the instance 141B to the GPU server 420B via one or more networks.

In one embodiment, if at least one virtual GPU 151C is already attached to the virtual compute instance 141B, then the synchronization request 616 may indicate the existing attachment. As shown in FIG. 9, when the request 616 indicates that the instance 141B already has at least one other virtual GPU attachment, then the shared version for the new virtual GPU 151B may be selected as the version 630A currently in use on the instance 141B in order to ensure compatibility with the existing virtual GPU(s). As discussed above with respect to FIG. 8, program code for the shared version 630A may be installed on the graphics virtual machine 430 on the GPU server 420. In one embodiment, the program code 630A for the shared version of the GPU interface may be provided to the GPU server 420 from a GPU interface repository 680. The GPU server manager 640 may install the shared version of the GPU interface 630A. The GPU server manager 640 may also remove or disable the initially installed version of the GPU interface 630B.

In one embodiment, the GPU interface synchronization may be dynamic, such that the virtual compute instance may be updated with a different version of a GPU interface while the instance is still running and without necessarily requiring a reboot (or restart, relaunch, or reprovisioning). In one embodiment, without necessarily requiring a reboot of the instance, one or more running applications that are using a particular version of a GPU interface may be terminated, the version of the GPU interface may be modified by installing and loading the appropriate program code on the instance, and the one or more applications may be relaunched on the instance to utilize the newly installed GPU interface. In one embodiment, the GPU interface synchronization may be dynamic, such that the GPU server may be updated with a different version of a GPU interface while the GPU server is still running and without necessarily requiring a reboot (e.g., restart, relaunch, or reprovisioning). In one embodiment, a newly provisioned GPU server may be used instead of the existing GPU server 420 if a different GPU interface is desired for use with the instance 141B.

In one embodiment, the dynamic GPU interface synchronization may ensure that a particular application uses a particular GPU interface version that is contractually required for the application, e.g., by a vendor of the GPU interface, despite a different version being suggested or otherwise in use by a GPU server that hosts an attached virtual GPU. In this manner, the elastic graphics service 110 may support multiple interface contracts based on versioning reconciliation and potentially using a single pool of virtual GPU resources rather than many pools of interface-specific virtual GPU resources. In one embodiment, the dynamic GPU interface synchronization may permit GPU interface bug fixes and other updates to be rolled out to both instances and GPU servers in an efficient and convenient manner. For example, the interface version in a machine image used to launch a virtual compute instance may not be as up-to-date as the interface version in use on a GPU server. In such circumstances, the newer version may be provided from the GPU server to the instance as part of the process of attaching a virtual GPU hosted by that server. In one embodiment, the dynamic GPU interface synchronization may permit interface updates to be rolled back on both instances and GPU servers in an efficient and convenient manner. For example, the interface version in a machine image used to launch a virtual compute instance may be up-to-date but error-prone and less reliable than older versions of the same interface. In such circumstances, a more reliable version may be provided from the GPU server to the instance as part of the process of attaching a virtual GPU hosted by that server. In one embodiment, the dynamic GPU interface synchronization may permit "debugging" versions of GPU interfaces to be deployed to both instances and GPU servers in an efficient and convenient manner. For example, in requesting an attached virtual GPU, a client of the provider network 100 may request a debugging mode (potentially with resources deployed in a test environment or isolated environment rather than a production environment) or may request a specific version of an interface that is particularly suited for debugging.

Figure 10:
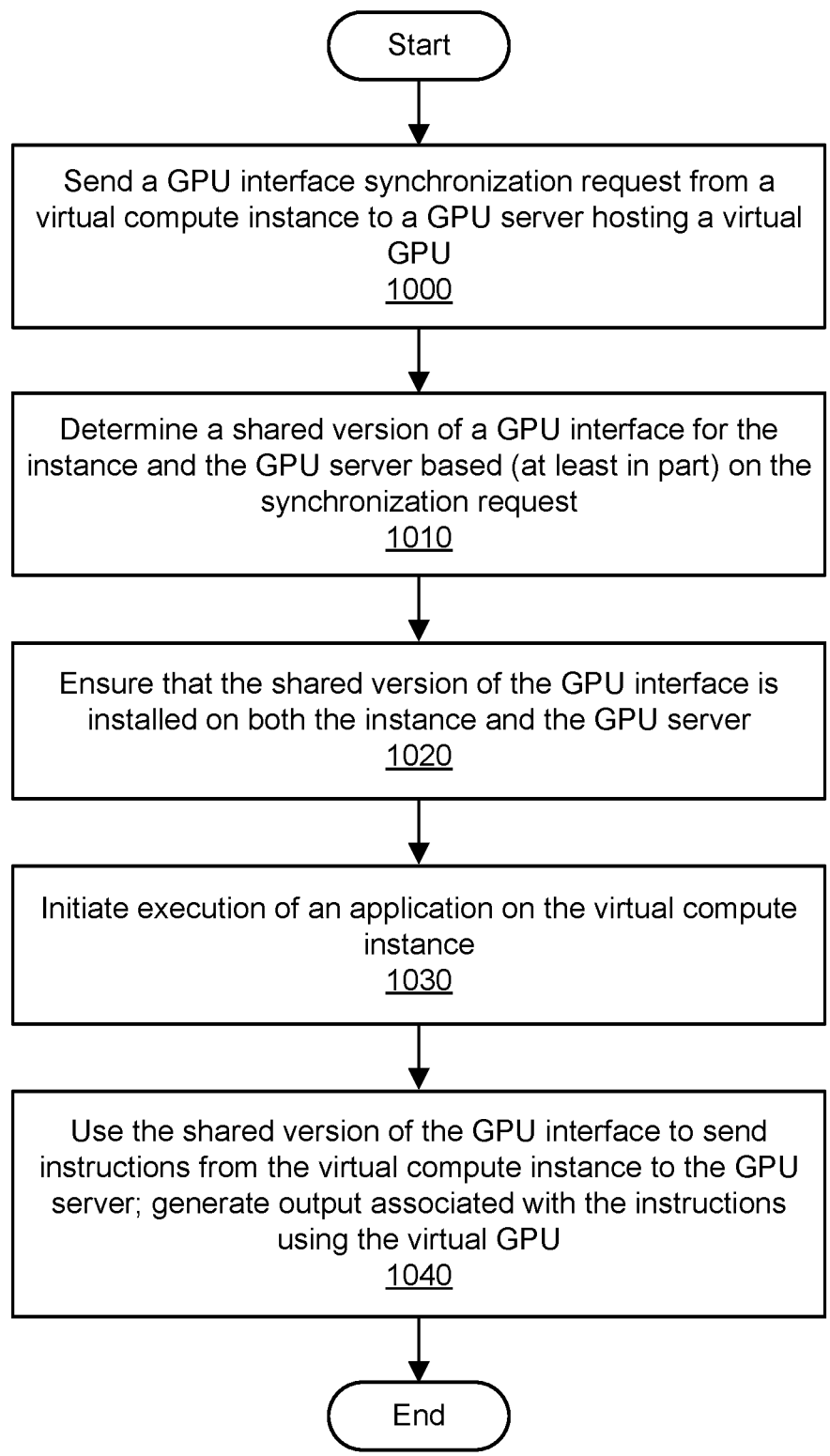
FIG. 10 is a flowchart illustrating a method for dynamic interface synchronization for virtualized graphics processing, according to one embodiment.

FIG. 10 is a flowchart illustrating a method for dynamic interface synchronization for virtualized graphics processing, according to one embodiment. A virtual GPU may be sought for attachment to the instance in order to assist a virtual compute instance in graphics processing or general-purpose GPU (GPGPU) computing. A GPU interface may also be installed on the instance for utilizing the virtual GPU. In one embodiment, the GPU interface may be initially installed upon launch of the instance based (at least in part) on its inclusion in a machine image containing essential software for the instance. As shown in 1000, a GPU interface synchronization request may be sent from the virtual compute instance to a GPU server hosting the virtual GPU. One or more GPU interfaces may also be installed on the GPU server for utilizing the virtual GPU, but the interface(s) may differ initially from the interface installed on the GPU server. The GPU interfaces (or drivers) on the two components may represent different interface families (e.g., OpenGL, DirectX, Vulkan, OpenCL, CUDA) or different versions within the same interface family (e.g., various numbered versions of OpenGL). In one embodiment, the latest stable version of a particular GPU interface family may initially be in use on the GPU server. However, the version initially in use at the instance may be an earlier version. The synchronization request may represent a request for synchronization of the version and family of the GPU interface for common use on both the instance and the GPU server.

In one embodiment, the synchronization request may be sent by an instance manager (also referred to as an application instance manager) on the compute instance to a GPU server manager (also referred to as a graphics appliance manager) on the GPU server. To send the synchronization request, the instance manager may perform a lookup of connection information for the GPU server manager using an instance metadata service or other suitable component. In one embodiment, the virtual GPU may be provisioned, e.g., from a pool of virtual GPU resources, after a request for attachment of a virtual GPU is received by an elastic graphics service. In one embodiment, the instance manager may wait for the GPU server manager associated with that virtual GPU to be reachable prior to sending the synchronization request. The synchronization request may indicate values for one or more parameters that may affect the selection of a version of a GPU interface to be shared by both the instance and the GPU server. In one embodiment, the synchronization request may indicate the current interface version on the instance. In one embodiment, the synchronization request may indicate whether the instance already has at least one other virtual GPU attachment. In one embodiment, the synchronization request may indicate whether the interface version already on the instance should be used as the shared version.

To permit the virtual GPU to be used by an application on the instance, the versions of the GPU interface may be synchronized between the GPU server and the instance. As shown in 1010, a shared version of a GPU interface may be determined for use on both the instance and the GPU server. The shared version may represent a particular version (e.g., as indicated by a version number) of a particular GPU interface or interface family (e.g., OpenGL, DirectX, Vulkan, OpenCL, CUDA, and so on). In one embodiment, the shared version may be chosen between an interface initially installed on the instance and an interface initially installed on the GPU server. The shared version may be determined based (at least in part) on the parameter values associated with the synchronization request. For example, if the request indicates that the instance already has at least one other virtual GPU attachment, then the shared version may be selected as the one currently in use on the instance in order to ensure compatibility with the other virtual GPU(s). As another example, the request may indicate whether or not the interface currently in use on the instance should be selected as the shared interface. In this manner, the application or its user may choose to "drive" the selection of the GPU interface, e.g., when the application is contractually obligated to use a particular version of a GPU interface. In the absence of such a requirement associated with the application or instance, the version currently in use at the GPU server may be selected as the shared version.

As shown in 1020, the method may ensure that the shared version of the GPU interface is installed on both the instance and the GPU server. In one embodiment, if the version already in use on the GPU server is selected, then program code for that version may be provided to the instance for installation and use. In various embodiments, the program code for the shared version of the GPU interface may be provided to the instance from the GPU server or from an external repository of GPU interfaces. In one embodiment, a security check on the program code may be performed by the instance, e.g., to ensure that the interface is properly signed or otherwise verified as legitimate. In one embodiment, if the version already in use on the instance is selected, then program code for that version may be loaded on the GPU server, e.g., from a GPU interface repository or from the vendor of the interface. In one embodiment, a security check on the program code may be performed by the GPU server, e.g., to ensure that the interface is properly signed or otherwise verified as legitimate.

Once the versions of the GPU interface are synchronized, then the instance manager and GPU server manager may communicate that the virtual GPU is ready for use by the instance. As shown in 1030, execution of an application may be initiated on the instance. Execution of the application may include generating requests for GPU functionality. As shown in 1040, the shared version of the GPU interface may be used to send instructions associated with execution of the application from the instance to the GPU server. The instructions may be expressed according to the particular version of the particular GPU interface that constitutes the shared version. For example, if the shared version represents a particular numbered version of OpenGL, then the instructions may be expressed as one or more function calls that are formatted in accordance with that particular numbered version. On the GPU server, output associated with those instructions may be generated using the virtual GPU attached to the instance. The output may also be generated according to the shared version of the GPU interface as installed on the GPU server. As discussed with reference to FIG. 1 through FIG. 5, the GPU output may be sent to the instance, to a client computing device, or to any other suitable recipient.

Figure 11:
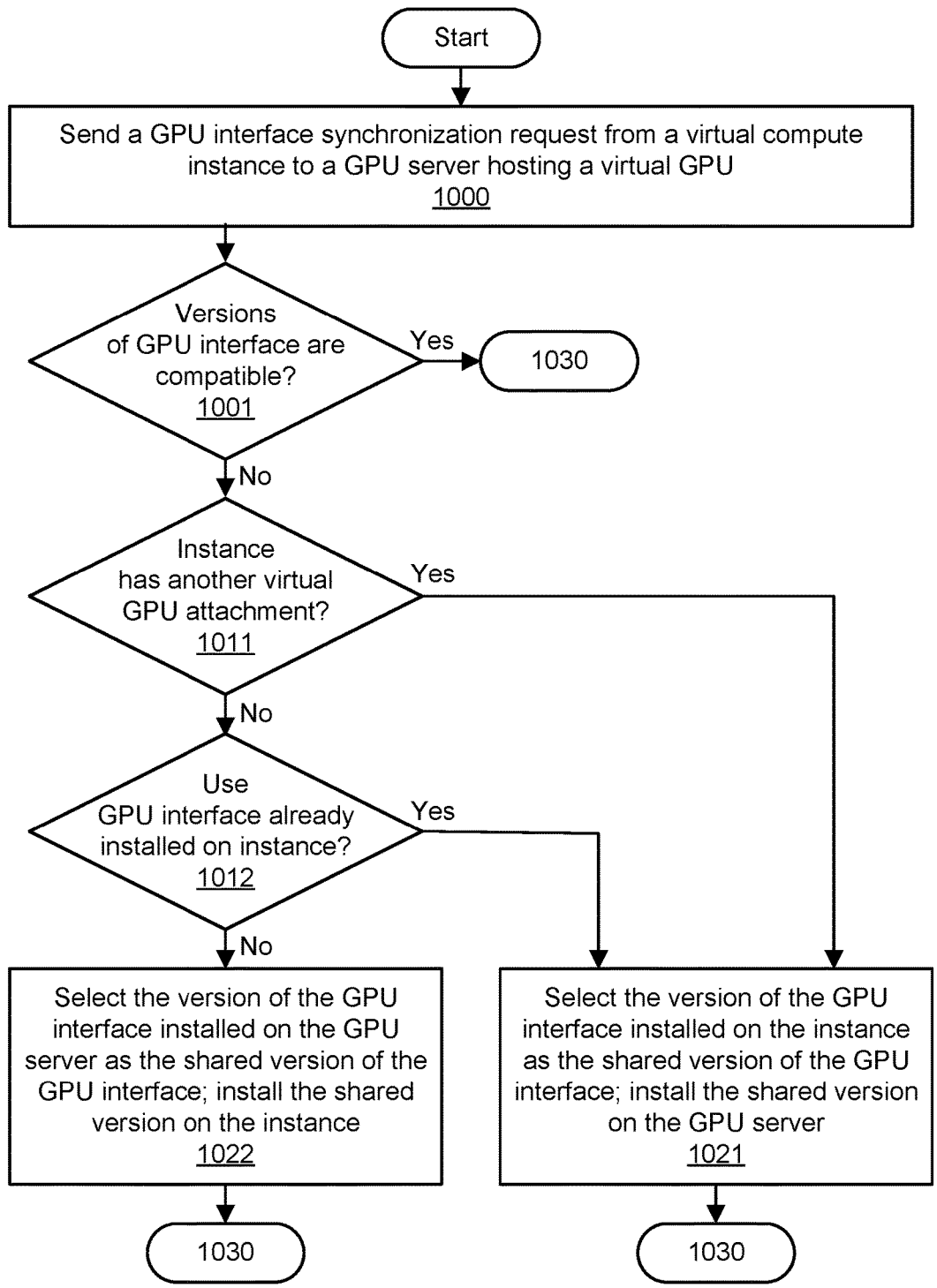
FIG. 11 is a flowchart illustrating further aspects of the method for dynamic interface synchronization for virtualized graphics processing, according to one embodiment.

FIG. 11 is a flowchart illustrating further aspects of the method for dynamic interface synchronization for virtualized graphics processing, according to one embodiment. As shown in 1000 and discussed above, a GPU interface synchronization request may be sent from the virtual compute instance to a GPU server hosting the virtual GPU. The operations shown in 1001, 1011, and 1012 may implement aspects of the operation shown in 1010.

As shown in 1001, the method may determine whether the version of the GPU interface in use on the instance is compatible with the version in use on the GPU server. In one embodiment, compatibility may be determined if the same version of the same GPU interface is currently in use on both components. In some embodiments, however, compatibility may be determined if the GPU server has a newer version of a particular GPU interface family that is backwards-compatible with an older version on the instance. In one embodiment, the GPU server manager may make the determination shown in 1001 based (at least in part) on a version number in use at the instance and supplied with the synchronization request. If the versions are determined to be compatible, then the method may continue with the operation shown in 1030.

As shown in 1011, the method may determine whether the instance already has at least one other virtual GPU attachment. In one embodiment, the GPU server manager may make the determination shown in 1011 based (at least in part) on a parameter value supplied with the synchronization request. For example, a hasAttachment parameter in the request may have the value TRUE to indicate that the instance has at least one other virtual GPU attachment already in place. If the instance already has another virtual GPU attachment, then the method may proceed with the operation shown in 1021.

As shown in 1012, the method may determine whether the GPU interface already in use on the instance should be used by both the instance and the GPU server. In one embodiment, the GPU server manager may make the determination shown in 1012 based (at least in part) on a parameter value supplied with the synchronization request. For example, an updatePolicy parameter in the request may have the value FIXED_VERSION to indicate that the version in use by the instance should also be used by the GPU server. If the version on the instance should be used as the shared version, then the method may proceed with the operation shown in 1021.

The operations shown in 1021 and 1022 may implement aspects of the operation shown in 1020. As shown in 1021, the version of the GPU interface currently installed on the instance may be selected as the shared version of the interface for use with both the instance and the GPU server. For example, if the request indicates that the instance already has at least one other virtual GPU attachment, then the shared version may be selected as the one currently in use on the instance in order to ensure compatibility with the other virtual GPU(s). As another example, the request may indicate that interface currently in use on the instance should be selected as the shared interface. In this manner, the application or its user may choose to "drive" the selection of the GPU interface, e.g., when the application is contractually obligated to use a particular version of a GPU interface. Under any of these circumstances, after the version already in use on the instance is selected as the shared version of the GPU interface, then program code for that version may be loaded on the GPU server, e.g., from a GPU interface repository or from the vendor of the interface. In one embodiment, a security check on the program code may be performed by the GPU server, e.g., to ensure that the interface is properly signed or otherwise verified as legitimate. The method may continue with the operation shown in 1030.

In the absence of both another virtual GPU attachment and a requirement for a specific GPU interface associated with the application, then as shown in 1022, the version of the GPU interface currently installed on the GPU server may be selected as the shared version of the interface for use with both the instance and the GPU server. After the version already in use on the GPU server is selected, then program code for that version may be provided to the instance for installation and use. In various embodiments, the program code for the shared version of the GPU interface may be provided to the instance from the GPU server or from an external repository of GPU interfaces. In one embodiment, a security check on the program code may be performed by the instance, e.g., to ensure that the interface is properly signed or otherwise verified as legitimate. The method may continue with the operation shown in 1030.

Illustrative Computer System

In at least some embodiments, a computer system that implements a portion or all of one or more of the technologies described herein may include a computer system that includes or is configured to access one or more computer-readable media. FIG. 12 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a virtual compute instance configured to execute an application, wherein the virtual compute instance is implemented in a multi-tenant provider network using a server comprising at least one central processing unit (CPU) and a memory, and wherein the virtual compute instance comprises a first GPU interface; and
a virtual graphics processing unit (GPU) attached to the virtual compute instance, wherein the virtual GPU is implemented in the multi-tenant provider network using a GPU server comprising at least one physical GPU, wherein the GPU server is accessible to the server via a network, and wherein the GPU server comprises a second GPU interface; and
wherein the virtual compute instance is configured to send, to the GPU server via the network, a GPU interface synchronization request, and wherein, responsive to the GPU interface synchronization request:
the virtual compute instance is configured to load, from the GPU server, program code of the second GPU interface, wherein the virtual compute instance is configured to initiate execution of the application using the second GPU interface to communicate with the virtual GPU; or
the GPU server is configured to use program code of the first GPU interface, wherein the virtual compute instance is configured to initiate execution of the application using the first GPU interface to communicate with the virtual GPU.

2. The system as recited in claim 1, wherein the first GPU interface and the second GPU interface comprise different versions of a GPU interface or GPU interfaces of different GPU interface families.

3. The system as recited in claim 1, wherein the first GPU interface or the second GPU interface is selected as a shared version of GPU interface based at least in part on one or more parameter values of the GPU interface synchronization request.

4. The system as recited in claim 1, wherein an additional virtual GPU is attached to the virtual compute instance prior to sending the GPU interface synchronization request, and wherein the first GPU interface is selected for use by the virtual compute instance and the GPU server.

5. A computer-implemented method, comprising:
sending, from a compute instance to a graphics processing unit (GPU) server via a network, a GPU interface synchronization request, wherein the compute instance is implemented using a server comprising at least one central processing unit (CPU) and a memory, and wherein the GPU server comprises a virtual GPU attached to the compute instance and implemented using at least one physical GPU;
based at least in part on the GPU interface synchronization request, determining a shared version of a GPU interface for use with the compute instance and the GPU server, wherein program code of the shared version of the GPU interface is installed on the compute instance and on the GPU server;
initiating execution of an application on the compute instance; and
using the shared version of the GPU interface on the compute instance to send instructions associated with the application to the virtual GPU over the network, wherein the virtual GPU generates GPU output associated with the instructions.

6. The method as recited in claim 5, wherein determining the shared version of the GPU interface comprises selecting a first version of a GPU interface installed on the compute instance or a second version of the GPU interface installed on the GPU server.

7. The method as recited in claim 5, wherein determining the shared version of the GPU interface comprises selecting a version of a first GPU interface installed on the compute instance or a version of a second GPU interface installed on the GPU server.

8. The method as recited in claim 5, wherein a GPU interface installed on the GPU server is selected as the shared version of the GPU interface based at least in part on one or more parameter values of the GPU interface synchronization request, and wherein the program code of the shared version of the GPU interface is sent from the GPU server to the compute instance.

9. The method as recited in claim 5, wherein a GPU interface installed on the compute instance is selected as the shared version of the GPU interface based at least in part on one or more parameter values of the GPU interface synchronization request.

10. The method as recited in claim 5, wherein an additional virtual GPU is attached to the compute instance prior to sending the GPU interface synchronization request, and wherein a GPU interface installed on the compute instance is selected as the shared version of the GPU interface.

11. The method as recited in claim 5, further comprising:
terminating the execution of the application on the compute instance;
installing a different version of the GPU interface on the compute instance and on the GPU server;
initiating an additional execution of the application on the compute instance, wherein the execution is terminated, the different version of the GPU interface is installed, and the additional execution is initiated without rebooting the compute instance; and
using the different version of the GPU interface on the compute instance to send additional instructions associated with the application to the virtual GPU over the network, wherein the virtual GPU generates additional GPU output associated with the additional instructions.

12. The method as recited in claim 5, wherein the compute instance comprises a virtual compute instance, and wherein the compute instance and the GPU server are implemented using resources of a multi-tenant provider network.

13. A non-transitory computer-readable storage medium storing program instructions computer-executable to perform:
sending, from a virtual compute instance to a graphics processing unit (GPU) server via a network, a GPU interface synchronization request, wherein the virtual compute instance is implemented using a server comprising at least one central processing unit (CPU) and a memory, and wherein the GPU server comprises a virtual GPU attached to the virtual compute instance and implemented using at least one physical GPU;
based at least in part on the GPU interface synchronization request, determining a shared version of a GPU driver for use with the virtual compute instance and the GPU server, wherein program code representing the shared version of the GPU driver is installed on the virtual compute instance and on the GPU server;
initiating execution of an application on the virtual compute instance; and
using the shared version of the GPU driver on the virtual compute instance to send instructions associated with the application to the virtual GPU over the network, wherein the virtual GPU generates GPU output associated with the instructions.

14. The non-transitory computer-readable storage medium as recited in claim 13, wherein a GPU driver installed on the virtual compute instance is selected as the shared version of the GPU driver based at least in part on one or more parameter values of the GPU interface synchronization request.

15. The non-transitory computer-readable storage medium as recited in claim 13, wherein determining the shared version of the GPU driver comprises selecting a first version of a GPU driver installed on the virtual compute instance or a second version of the GPU driver installed on the GPU server.

16. The non-transitory computer-readable storage medium as recited in claim 13, wherein determining the shared version of the GPU driver comprises selecting a version of a first GPU driver installed on the virtual compute instance or a version of a second GPU driver installed on the GPU server.

17. The non-transitory computer-readable storage medium as recited in claim 13, wherein a GPU driver installed on the GPU server is selected as the shared version of the GPU driver based at least in part on one or more parameter values of the GPU interface synchronization request, and wherein the program code of the shared version of the GPU driver is sent from the GPU server to the virtual compute instance.

18. The non-transitory computer-readable storage medium as recited in claim 13, wherein an additional virtual GPU is attached to the virtual compute instance prior to sending the GPU interface synchronization request, and wherein a GPU driver installed on the virtual compute instance is selected as the shared version of the GPU driver.

19. The non-transitory computer-readable storage medium as recited in claim 13, wherein a GPU driver on the GPU server is updated to a latest version prior to the GPU server receiving the GPU interface synchronization request.

20. The non-transitory computer-readable storage medium as recited in claim 13, wherein the virtual compute instance and the GPU server are implemented using resources of a multi-tenant provider network.

* * * * *